United States Patent [19]

Magrobi

[11] Patent Number: 4,683,735
[45] Date of Patent: Aug. 4, 1987

[54] VEHICLE SECURITY DEVICES

[75] Inventor: Brian Magrobi, Mondeor, South Africa

[73] Assignee: Johan C. Genis, Pretoria, South Africa

[21] Appl. No.: 832,967

[22] Filed: Feb. 25, 1986

[51] Int. Cl.⁴ .............................................. B65D 55/14
[52] U.S. Cl. ...................................................... 70/168
[58] Field of Search .................. 70/158, 163–173, 70/237, 258; 138/89; 220/210, 290, 315

[56] References Cited

U.S. PATENT DOCUMENTS

| | | | |
|---|---|---|---|
| 969,776 | 9/1910 | Foley | 70/168 |
| 1,383,784 | 7/1921 | Bonza | 70/173 |
| 1,782,584 | 11/1930 | Ryan | 70/173 |
| 3,901,407 | 8/1975 | Mitchell | 70/169 |

Primary Examiner—Robert L. Wolfe
Attorney, Agent, or Firm—Ladas & Parry

[57] ABSTRACT

A lockable closure for the exhaust pipe of an internal combustion engine is provided. The exhaust pipe closure finds particular application as an immobilization and theft prevention device on motor vehicles and comprises a lockable cap adapted to fit onto an extender tube (or the exhaust pipe, which has been suitably modified). The cap includes a pair of jaws which may be urged outwardly by means of a plunger to engage a locating formation in either the exhaust pipe or the extender tube.

4 Claims, 8 Drawing Figures

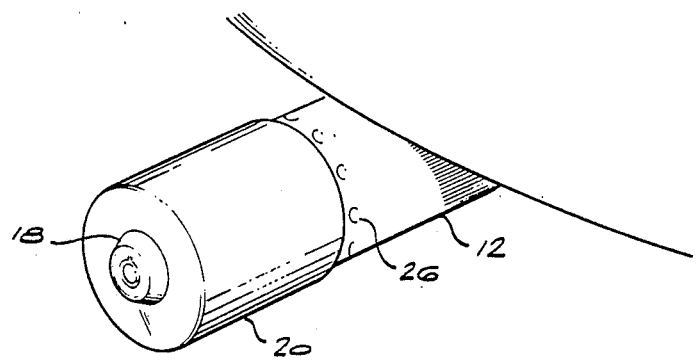
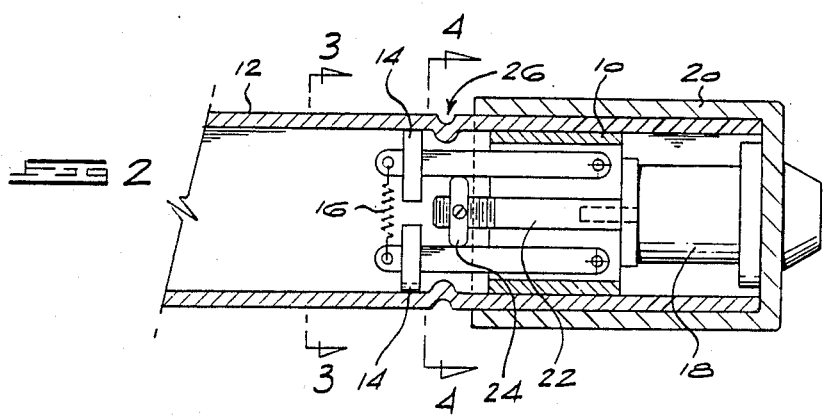
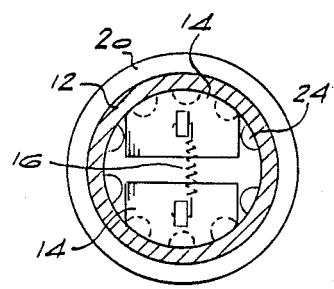
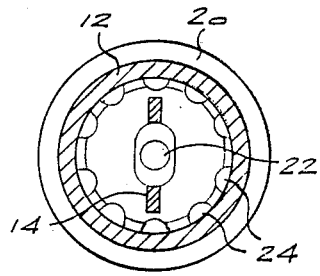

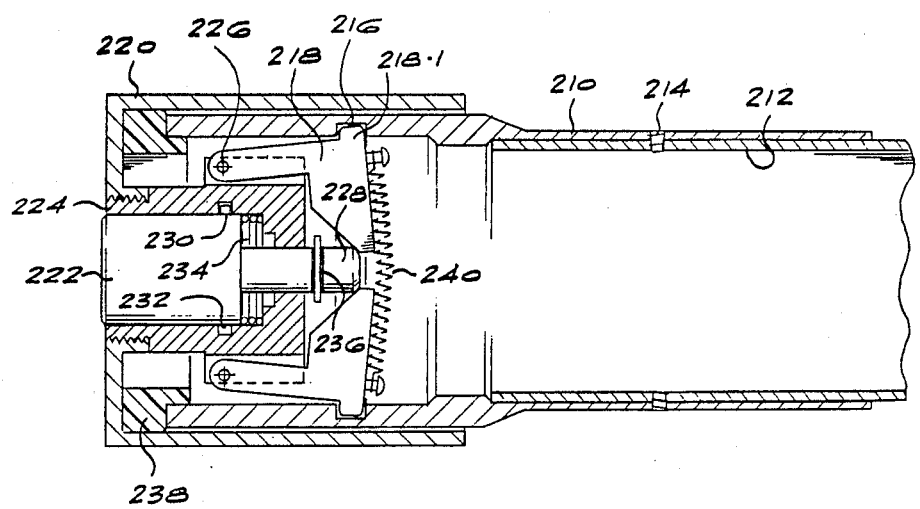

VEHICLE SECURITY DEVICES

BACKGROUND OF THE INVENTION

This invention relates to a lockable closure for an exhaust pipe of an internal combustion engine.

The invention finds particular application as a motor vehicle security device in that the exhaust pipe of the motor vehicle can be closed using the lockable closure of the invention and the engine thereof can be choked to immobilise the vehicle. The invention will be described with reference to such an application, but it will be appreciated that this is done merely by way of example.

SUMMARY OF THE INVENTION

A lockable closure for the exhaust pipe of an internal combustion engine is provided and comprises a lockable cap removably securable onto the end of the exhaust pipe which is formed with one or more inwardly directed locating formations, the cap including one or more expandable jaws adapted to project into the exhaust pipe and releasably to engage the locating formation or formations when the cap is in position on the exhaust pipe and the jaws being lockable in the engaged position to lock the cap on the end of the exhaust pipe.

The lockable closure may include an extender tube adapted for securement co-axially onto the end of the exhaust pipe, the lockabe cap being removably securable onto the end of the extender tube which includes an inwardly directed locating formation, the cap including one or more expandable jaws adapted to project into the extender tube and releasably to engage the locating formation when the cap is in position on the extender tube and the jaws being lockable in the engaged position to lock the cap on the end of the extender tube and therefore close off the exhaust pipe.

The closure may be adapted substantially to seal the exhaust pipe against the escape of exhaust gas when the extender tube is secured on the exhaust pipe and the cap is locked in position on the extender tube. In this manner the internal combustion engine will be choked to the point of inoperability very rapidly due to the increased back pressure in the exhaust pipe if an attempt is made to operate the engine. The closure need not be completely gas tight since a seal sufficient to choke off the engine is all that is required. In fact, it is desirable for the closure to allow a limited amount of gas to escape and in the preferred form of the invention, the locking mechanism is not completely gas tight and serves the purpose of allowing the escape of a limited amount of gas thereby providing a simple pressure regulation mechanism.

It is also possible to allow a certain amount of the gas to escape through a turbine or other sound generator. This is particularly advantageous where the lockable closure is used as an immobilisation and theft prevention device on a motor vehicle.

The closure may be provided with a pair of jaws, the ends of which include locating formations complemental to the locating formation in the extender tube or the exhaust pipe, which are pivotably mounted within the cap and a locking mechanism including a plunger adapted for interposition between the jaws to expand the free ends thereof outwardly for inter-engagement of the locating formations on the jaws and extender tube. The locating formation on the extender tube may be constituted by a groove extending circumferentially about the inner surface of the extender tube.

The locking mechanism may be constituted by a cylinder lock including one or more locking pins which are adapted to extend outwardly into a pin locating formation constituted by a circumferential groove formed in a lock, housing in the cap. The use of circumferential grooves as locating formations for the jaws and the locking pin ensures the free rotatability of the lock itself and the cap on the end of the extender tube which enhances the effectiveness of the closure since the difficulty of forcing the closure and of tampering with the lock is increased substantially. The plunger and locking mechanism may be integral and extend axially along the principal axis of the closure, the locking mechanism being spring loaded axially outwardly and the plunger being provided with a stop formation to prevent the unintentional removal of the locking mechanism and plunger.

The jaws may be biased inwardly towards one another to allow release of the locating formations and therefore of the cap.

As has been mentioned above, the invention finds particular application as an exhaust closure for a motor vehicle and the invention therefore extends in scope to a theft prevention device for a motor vehicle comprising a lockable closure as described above which is adapted for attachment to the exhaust pipe of a motor vehicle. In this case, the closure may include a dummy exhaust pipe secured to the extender tube and adapted to extend parallel to the motor vehicle exhaust pipe. The dummy exhaust pipe may be adapted releasably to retain the cap when the latter is not in use closing off the exhaust pipe.

BRIEF DESCRIPTION OF THE DRAWINGS

The invention will be further described with reference to the accompanying drawings in which:

FIG. 1 is an isometric view of one form of closure fitted to an exhaust pipe;

FIG. 2 is a sectional side elevation of the closure of FIG. 1;

FIG. 3 is an end section in line 3—3 on FIG. 1;

FIG. 4 is an end section in line 4—4 on FIG. 2;

FIG. 8 is a sectional side elevation of yet an alternative form of closure.

DESCRIPTION OF EMBODIMENTS OF THE INVENTION

Figure 5:
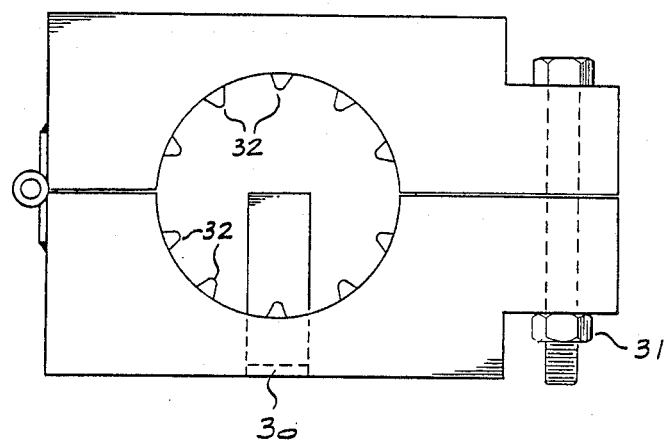
FIG. 5 is a crimping tool for use in preparing a vehicle exhaust pipe for the closures of FIGS. 1 to 4.

The closure shown in FIGS. 1 to 4 comprises a plug 10 which fits inside the end of the exhaust pipe 12 of an internal combustion engine of, for instance, a motor vehicle. A pair of pivoted jaws 14 are biased towards one another by a spring 16 and a key operated lock is rotatably mounted in the end of a cap 20 which fits over the outside of the exhaust pipe 12. The lock is connected to a plunger 22 interposed between the arms of the jaws 14 and, at its end, is provided with a cam formation 24. The cylinder lock 18 prevents the rotation of the plunger 22 unless released by means of a key (not shown). Once this has been done, the plunger 22 can be rotated for the cam formation 24 to urge the jaws 14 outwardly towards the inner surface of the exhaust pipe 12.

The surface of the exhaust pipe 2 is crimped inwardly in a series of crimped depressions 26 and, as can be seen from FIG. 2, the jaws 14 are trapped behind the crimp formations 26 when the cam formation 24 is rotated such that the jaws are urged outwardly.

The closure as a whole can now not be removed until the lock 18 is operated. Since the lock 18 is rotatably mounted, the sleeve 20 can rotate without disturbing the lock 18 or moving the jaws 14 and this ensures that the closure cannot be removed by an unauthorised person attempting to force the lock through rotation of the cap 20.

The closure can be arranged for the jaws 14 to spring past the crimped deformations 26 even when the lock 18 is locked. This enables the closure to be fitted without a key which will only be required to release the closure when necessary.

Figure 6:
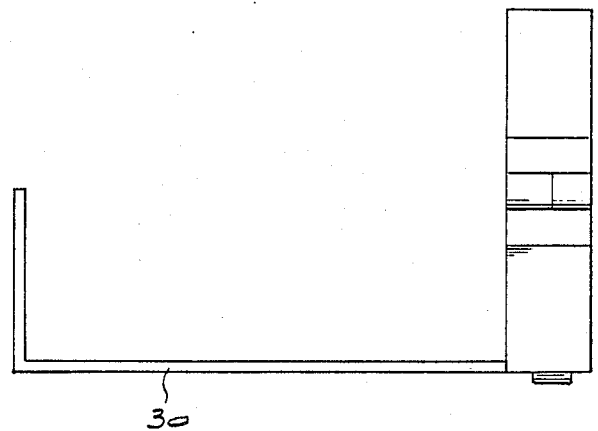
FIG. 6 shows the crimping tool in side elevation.

FIGS. 5 and 6 show a crimping tool which may be used to prepare the end of an exhaust pipe for fitting of the closure. The tool is opened and placed over the end of the exhaust pipe with a gauge bar 30 butting up against the free end of the pipe to ensure that the crimping operation is carried out at the desired distance from the end of the exhaust pipe. The tool is then closed around the end of the exhaust pipe and a nut 31 is tightened for a plurality of crimping projections 32 to deform the surface of the exhaust pipe as required.

The closure and the various components thereof are fitted to ensure a relatively gas-tight over the end of the exhaust pipe. If the engine is now started, it will be choked very rapidly by the increasing back pressure building up within the exhaust pipe and, if the closure of the invention is fitted to a motor vehicle, the motor vehicle would be immobilized. The engine will only run satisfactorily once an authorised user of the vehicle has removed the closure from the exhaust pipe.

To improve the seal, a sealing ring or circular pad may be fitted.

Figure 7:
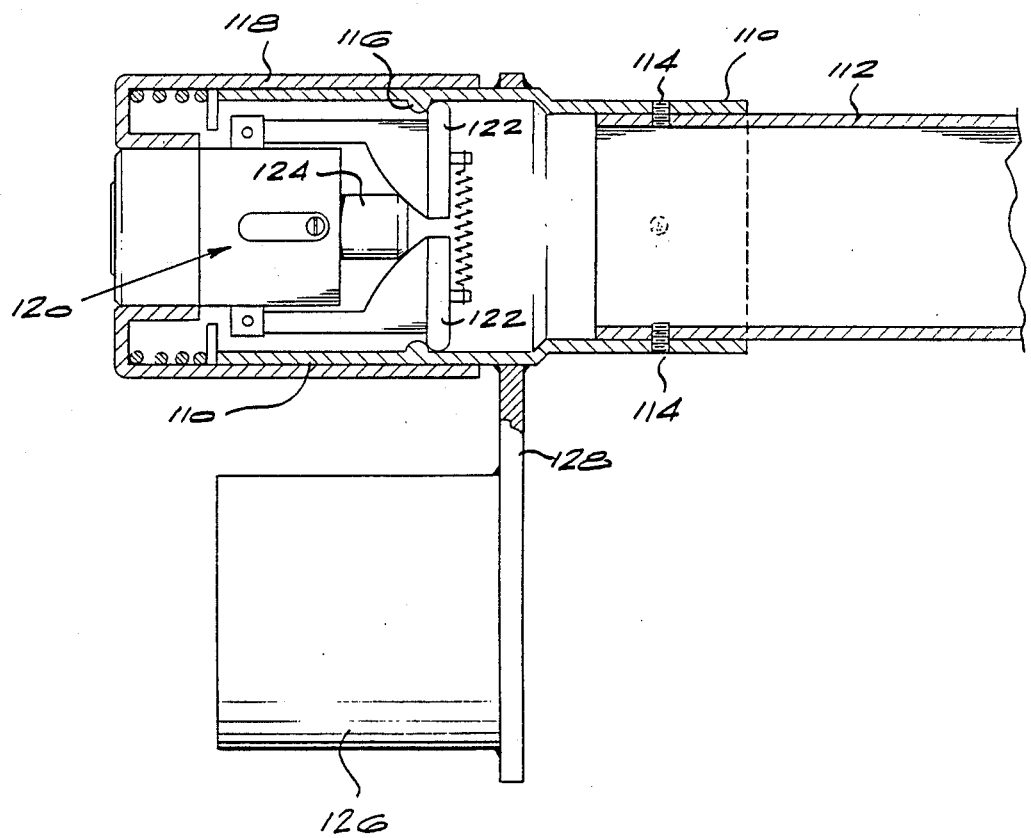
FIG. 7 is a sectional side elevation of an alternative closure which includes a dummy exhaust pipe.

In the embodiment shown in FIG. 7, an extender tube 110 is secured onto the end of an exhaust pipe 112 by means of shear screws 114. The extender tube 110 is formed with inwardly directed locating formations constituted by a circumferential bead 116 extending about the inner surface of the extender tube 110.

A cap 118 fits releasably over the outside of the extender tube 110 and supports a key operated locking mechanism 120 including two spring biased jaws 122 and a plunger 124.

When the plunger 124 is in the position shown, the jaws 122 are urged apart and engage behind the bead 116 so that the cap 118 cannot be removed. A key is required to be inserted and turned in the locking mechanism 120 to cause the plunger 124 to withdraw so that the cap 120 can be removed.

A dummy exhaust pipe 126 is provided and adapted to retain the cap 118 in position for convenience and transport when it is not required to close off the exhaust pipe 122. The dummy exhaust pipe 126 is attached to and supported by the extender tube 110 by means of a bracket 128.

Where, as has been described with reference to FIGS. 1 to 4, the cap fits directly onto the end of the exhaust pipe, the bracket 128 may be arranged for securement directly to the exhaust pipe.

An alternative closure, similar to that shown in FIG. 7 is shown in FIG. 8. An extender tube 210 is secured to an exhaust pipe 212 by means of shear screws 214. The extender tube is formed with a circumferentially extending groove 216 which constitutes a locating formation for complemental locating formations 218.1 formed on the ends of a pair of pivoted jaws 218.

The jaws 218 form part of a cap 220 which supports a cylinder lock 222 within a lock housing 224 to which the jaws 218 are pivoted at 226. The cylinder lock is integral with a plunger 228 and includes a locking pin 230 which is adapted to engage a groove 232 formed circumferentially within the lock housing 224. The lock 222 is biased outwardly by means of a compression spring 234 and a circlip 236 is provided to prevent unintentional removal of the lock plunger mechanism from the housing 234. A seal 238 is provided between the end of the extender tube 210 and the inner surface of the cap 220.

The jaws 218 are biased towards one another by means of a tension spring 240.

The plunger 228 is interposed between the two jaws 218 in the position shown in the drawing so that the jaws 218 are expanded outwardly with the locating formations 218.1 thereof engaging the locating formation constituted by the groove 216 in the extender tube 210. In this position the cap 220 is locked onto the end of the extender tube and therefore closes off the exhaust pipe 212 thereby disabling the operation of the internal combustion engine of which the exhaust pipe 212 is a part.

Since. the locating formations of the closure are constituted by jaws 218.1 or a pin 230 which are freely rotatable within circumferentially extending grooves 216, 232, the cap 220 can rotate freely on the extender tube 210 and the lock 222 can rotate freely within the housing 224 in the cap 220. Unauthorised removal of the cap 220 is therefore extremely difficult.

To remove the cap 220, the lock 222 is operated by means of a key (not shown) which results in withdrawal of the locking pin 230 and axially outward movement of the lock and plunger combination. The jaws 218 are retracted by means of the tension spring 240 and the cap 220 is free for removal from the end of the extender tube 210. To replace the cap, it is merely fitted onto the end of the extender tube and the lock 222 is pressed inwardly against the bias of the spring 234 until the spring loaded locking pin 230 engages the groove 234.

I claim:

1. A lockable closure for the exhaust pipe of an internal combustion engine including an extender tube adapted for securement coaxially onto the end of the exhaust pipe, a lockable cap removably securable onto the end of the extender tube which includes an inwardly directed locating formation consituted by a groove extending circumferentially about the inner surface of the extender tube, the cap including one or more expandable jaws adapted to project into the extender tube and releasably to engage the locating formation when the cap is in position on the extender tube and a locking mechanism constituted by a cylinder lock including one or more locking pins which are adapted to extend outwardly into a pin locating formation constituted by a circumferential groove formed in a lock housing in the cap, the locking mechanism being adapted to allow the passage of a certain amount of exhaust gas under pressure when the extender tube is secured on the exhaust pip and the cap is locked into position on the extender tube and the jaws being lockable in the engaged position to lock the cap on the end of the extender tube.

2. A lockable closure according to claim 1 which is provided with a pair of jaws which are biased inwardly towards one another, the ends of the jaws including locating formations complemental to the locating formation in the extender tube, the jaws being pivotably mounted within the cap, and the locking mechanism including a plunger adapted for interposition between the jaws to expand the free ends thereof outwardly for interengagement of the locating formations on the jaws and the locating formation in the extender tube.

3. A lockable closure according to claim 2 in which the plunger and locking mechanism are integral and extend axially along the principal axis of the closure, the locking mechanism being spring loaded axially outwardly and the plunger being provided with a stop formation adapted to prevent unintentional removal of the locking mechanism and plunger.

4. A theft prevention device for a motor vehicle comprising a lockable closure according to any one of claims 1 to 3 which is adapted for attachment to the exhaust pipe of a motor vehicle and which includes a dummy exhaust pipe secured to the extender tube, the dummy exhaust pipe being adapted releasably to retain the cap.

* * * * *